United States Patent [19]
Carr

[11] Patent Number: 5,908,067
[45] Date of Patent: Jun. 1, 1999

[54] APPARATUS FOR MAKING HERRINGBONE GEARS AND PUMPS INCORPORATING THE SAME

[75] Inventor: Charles F. Carr, Vancouver, Wash.

[73] Assignee: Micropump, Inc., Vancouver, Wash.

[21] Appl. No.: 09/144,572

[22] Filed: Sep. 1, 1998

Related U.S. Application Data

[62] Division of application No. 08/795,523, Feb. 5, 1997, Pat. No. 5,865,239.
[51] Int. Cl.⁶ .......................... B22D 17/00; B22D 29/00
[52] U.S. Cl. ......................... 164/312; 164/401; 164/406; 164/344
[58] Field of Search .................... 164/312, 344, 164/131, 401, 406, 113

[56] References Cited

U.S. PATENT DOCUMENTS

4,690,009  9/1987  Rakhit ........................................ 74/409

*Primary Examiner*—Patrick Ryan
*Assistant Examiner*—I.-H. Lin
*Attorney, Agent, or Firm*—Hill & Simpson

[57] ABSTRACT

An apparatus for manufacturing herringbone gears with an injection molding process is provided. The apparatus involves the use of two separable mold halves each of which include a mold cavity for molding one half of the gear. Moldable material is injected into the mold halves when they are in a sealing abutting engagement. After the material solidifies, the mold halves are separated and the gear is simultaneously unscrewed from each mold cavity.

10 Claims, 10 Drawing Sheets

APPARATUS FOR MAKING HERRINGBONE GEARS AND PUMPS INCORPORATING THE SAME

CROSS-REFERENCE TO RELATED APPLICATION

This application is a Division of Ser. No. 08/795,523, filed Feb. 5, 1997, and now issued as U.S. Pat. No. 5,865,239.

FIELD OF THE INVENTION

The present invention relates generally to gear pumps utilizing meshing herringbone gears. More specifically, the present invention relates to an improved method and apparatus for manufacturing herringbone gears and gear pumps that incorporate the herringbone gears made in accordance with the present invention.

BACKGROUND OF THE INVENTION

Gear pumps are positive displacement pumps utilizing a set of gears as the displacement device. The most common type of gear used in fluid pumps is the helical gear. Helical gears are preferred because of their quiet operation, hydraulic efficiency, conjugate mechanical motion, constant sealing of the surfaces between the mating gear flanks and the minimum entrapment of fluid between the teeth that are in contact. Further, the helical gear, with its angled teeth, typically has a higher load carrying capacity than the spur gear, which has straight teeth. Because helical gears tend to run more smoothly than spur gears, helical gears can normally operate at faster speeds.

However, one substantial drawback with the helical gear is the creation of an axial thrust which results from the helical lead or angle of the gear teeth. In operation, the axial thrust must be absorbed by the bearings that support the gear shafts. As a result, relatively expensive bearings are required to absorb these axial forces.

In order to eliminate the axial thrust associated with the use of helical gears, herringbone gears were developed. A herringbone gear is constructed of adjacent helical gear halves whereby the teeth of the adjacent halves are angled in an opposite direction. A comparison of two meshing helical gear teeth 11, 12 and two meshing herringbone gear teeth 13, 14 is provided in FIGS. 1 and 2 respectively. The helical gears 11, 12 shown in FIG. 1 have one helical slant or angle with respect to the longitudinal gear axis although the helical slant of the gear 11 is angled upward from left to right in FIG. 1 and, in contrast, the helical slant of the gear 12 is angled downward from left to right in FIG. 1. In short, the magnitude of the helical slants of the gears 11, 12 are the same, but in opposite directions.

In contrast, the gears 13, 14 each have two adjacent halves with helical slants of the same magnitude but in opposing directions. The gear 13 includes adjacent gear halves 15, 16. The helical slant of the gear half 15 extends downward from left to right and the helical slant of the gear half 16 extends upward from left to right. Similarly, the gear 14 includes gear halves 17, 18. The gear half 17 has a helical slant which extends upward from left to right in FIG. 2 while the gear half 18 has a helical slant that extends downward from left to right in FIG. 2. The magnitude of the helical slants of the gear halves 15, 16, 17, 18 are the same or substantially the same but the gear halves disposed at the left in FIG. 2, specifically the gear halves 15, 17 have helical slants that are oppositely directed to the gear halves disposed at the right in FIG. 2, specifically the gear halves 16, 18.

Figure 1:
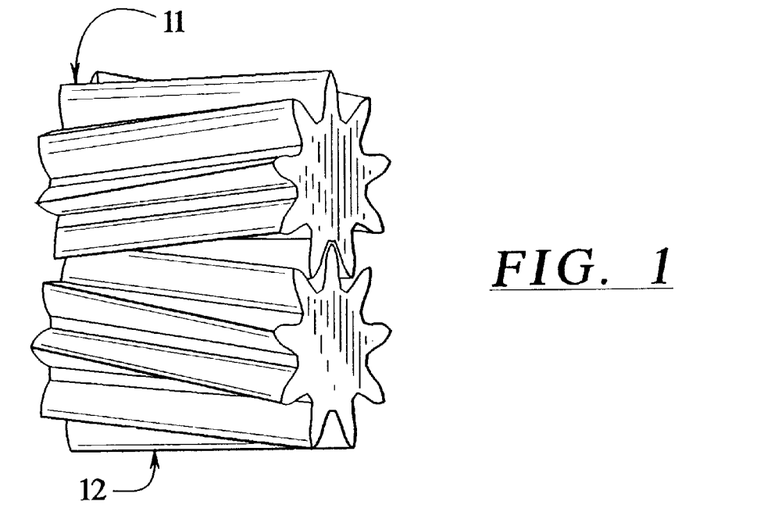
FIG. 1 is a perspective view of two helical gears taught by the prior art.
Figure 2:
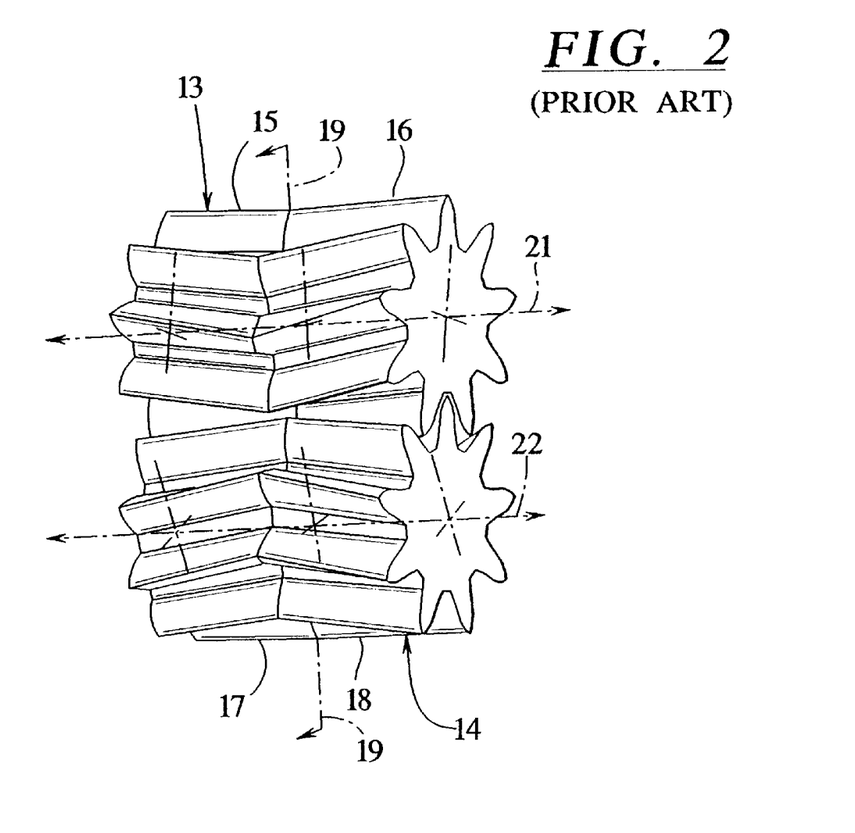
FIG. 2 is a perspective view of two herringbone gears taught by the prior art.

By incorporating gear halves such as 15, 16 and 17, 18 which have helical slants of the same magnitude but in opposite directions, the herringbone gears 13, 14 provide excellent power or fluid transmission without an axial thrust which is the result of the helical slant of the helical gears 11, 12 as shown in FIG. 1.

It will also be noted that the gear halves 15, 16 and 17, 18 are disposed on opposite sides of a central plane shown at the line 19 drawn in phantom which passes through each gear 13, 14 perpendicular to the longitudinal axes 21, 22 of the gears 13, 14 and at a mid-point along the longitudinal axes 21, 22 of the gears 13, 14.

However, while effective in eliminating the axial thrust imposed upon the shaft and bearing by helical gears, herringbone gears are difficult and expensive to manufacture. Specifically, they cannot be manufactured using a hobbing or shaping process due to the change in direction of the helical slant. As a result, the manufacture of herringbone gears in the past has been labor intensive and, as a result, expensive.

One approach at alleviating this problem has been to manufacture "pseudo" herringbone gears. Pseudo herringbone gears include two oppositely angled helical gears that are coupled or attached together at the longitudinally central plane such as 19 shown in FIG. 2. One such method for manufacturing pseudo herringbone gears is disclosed in U.S. Pat. No. 4,690,009. However, the process disclosed in the '009 patent is relatively slow and requires complex machine tools to carry out the operation.

Currently, there is no available manufacturing process to manufacture herringbone gears using a molding method or an injection molding method. Such a method would be beneficial due to its high speed of operation and low cost. A molding process would also result in a unitary gear instead of two gears that are coupled or attached together. Accordingly, there is a need in the pumping and pump manufacture industry for a method of manufacturing herringbone gears which utilizes a molding process.

SUMMARY OF THE INVENTION

To address the aforenoted need in the art, the present invention provides a method of manufacturing herringbone gears utilizing an injection molding process. The process includes the steps of providing a mold that includes two separate mold halves. The mold halves correspond to the two halves of the herringbone gear. Each mold half includes an inner mating face for sealing engagement with the inner mating face of the other mold half. When placed in a sealing abutting engagement, the two mating faces of the mold halves correspond to the central plane of the gear.

One of the mold halves includes a gate for injecting molding material into the two adjoining mold cavities when the two mold halves are pushed together. At least one of the mold halves is capable of longitudinal movement along the longitudinal axis of the gear.

The method of the present invention further comprises the steps of moving the mold halves together to engage the inner mating faces of each mold half, injecting molding material through the gate, allowing the molding material to solidify to form a molded herringbone gear and, simultaneously extracting the gear from the mold and opening the mold by moving the mold halves apart. During the extraction opening step, each gear half becomes unscrewed from its respective mold cavity as the entire gear rotates.

In an embodiment, one of the mold halves also includes an elongated cavity disposed adjacent to the mold half cavity for accommodating a gear shaft or gear axle. The method of the present invention further comprises the step of inserting a gear shaft through the elongated cavity and through both mold half cavities before the molding material is injected.

The present invention also provides an apparatus for manufacturing molded herringbone gears. The apparatus comprises two mold halves, at least one of which is capable of longitudinal movement along the longitudinal axis of the gear. Other than the longitudinal movement of at least one mold half, the mold halves are preferably constrained in all other directions. Each mold half comprises an inner mating face for sealing engagement with the opposing inner mating face of the other mold half. The two mating faces of the mold halves correspond to the central plane of the gear. One of the mold halves includes a gate for injecting molding material into the mold cavities.

In an embodiment, one of the mold halves further includes an elongated cavity disposed along the longitudinal axis of the gear for accommodating a gear shaft. The gear shaft may be inserted into the mold cavities before the molding material has been injected into the cavities and, before the molding material has hardened.

In an embodiment, an ejection or extractor tool passes through an end of one mold half and engages the molded gear and pushes the molded gear out of said mold half as the mold is opened.

In an embodiment, one of the mold halves is slightly longer than the other mold half which results in the finished part being retained in one of the mold halves as the mold is opened. As a result, an ejection device can be utilized to reliably clear the molding apparatus for subsequent cycles.

In an embodiment, the gate further comprises a stripper plate.

In an embodiment, the gate is further characterized as being a helical gate having a helical lead substantially the same as the helical lead of the mold half on which the gate is disposed.

In an embodiment, the gate is further characterized as being a conically shaped gate having an interior surface that slants from an end of a mold cavity toward the longitudinal axis of the gear at an angle that is substantially the same angle as the helical lead of the mold half or mold cavity adjacent to which the gate is disposed.

In an embodiment, each mold half is capable of longitudinal movement along the longitudinal axis of the gear so that both mold halves may be simultaneously moved apart when the molded herringbone gear is being ejected from the mold cavities.

The present invention also provides an improved pump that includes a housing having a pump cavity. The pump cavity accommodates two injection molded herringbone gears. One of the injection molded herringbone gears is mounted on a drive axle and the second injection molded herringbone gears is in meshing engagement with the first injection molded herringbone gear.

Each of the gears is of the same configuration as discussed above and, in a preferred embodiment, each of the gears is manufactured using an injection molding process as discussed above.

It is therefore an object of the present invention to provide an improved method of manufacturing herringbone gears.

Another object of the present invention is to provide an improved apparatus for manufacturing herringbone gears.

Still another object of the present invention is to provide an improved pump incorporating injection molded herringbone gears.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figures 3, 3A:
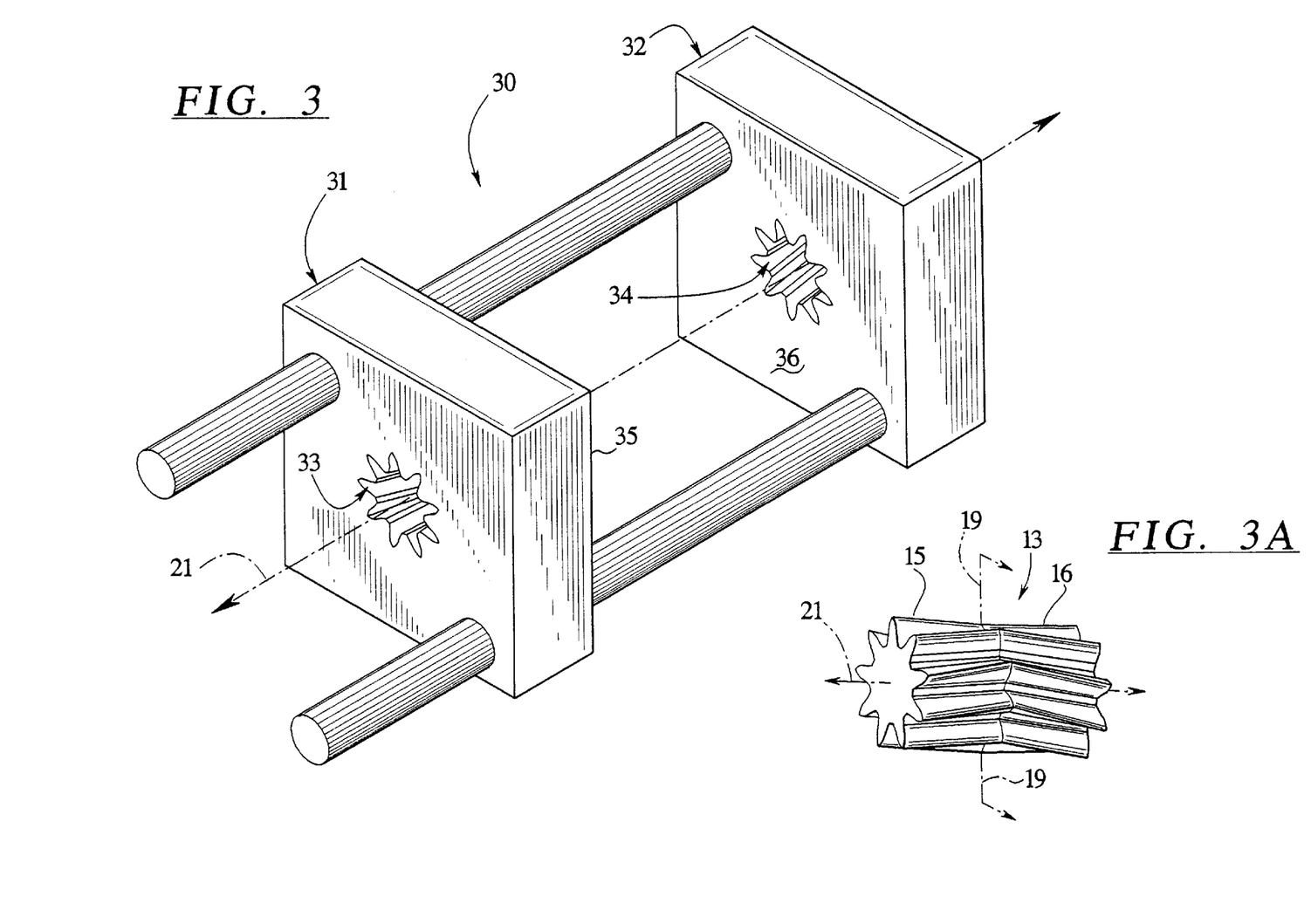
FIG. 3 is a schematic illustration of an apparatus for manufacturing herringbone gears in accordance with the method of the present invention.
FIG. 3A is a perspective view of a herringbone gear manufactured with the apparatus illustrated in FIG. 3.

FIG. 3 is an illustration of an apparatus 30 used to manufacture the herringbone gear 13 shown in FIG. 3A.

Figure 4:
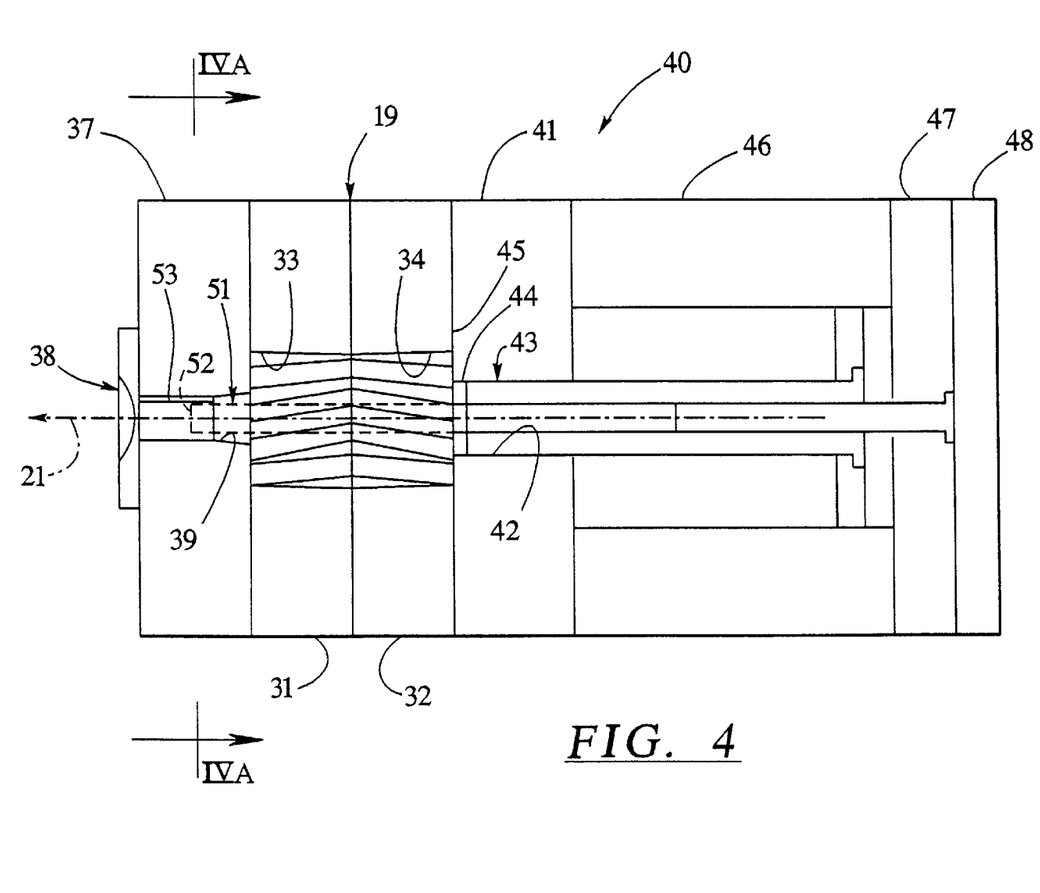
FIG. 4 is a sectional view of an apparatus used to manufacture herringbone gears in accordance with the present invention.

Specifically, the apparatus 30 includes two mold halves 31, 32 which include cavities shown at 33, 34 which are used to mold the gear halves 15, 16 respectively. One of the mold halves, and specifically the mold half 31 as shown in FIG. 3 is capable of movement along the longitudinal axis 21 of the gear 13 each mold half 31, 32 includes an inner mating face 35, 36 respectively which are in an abutting, sealing engagement when molding material is injected into the cavities 33, 34 as illustrated in FIG. 4. Still referring to FIG. 3, the mold half 31 is capable of movement along the longitudinal axis 21 only. It will be noted that both mold halves 31, 32 are preferably restrained in all other directions.

Turning to FIG. 4, an apparatus 40 is illustrated which includes mold halves 31, 32 in a sealing and abutting engagement. The inner mating faces of each seal half 31, 32 are disposed along the center plane 19 of the gear 13 (see also FIG. 3A). The mold half 31 is attached to an end plate 37 which accommodates a gating system 38. In the embodiment 40 shown in FIG. 4, the gating system includes a conically-shaped sprue 39 which has an angle substantially the same or similar to the helical lead of the gear pattern of the cavity 33. In other words, the inside surface of the conical sprue 39 extends downward to the left in FIG. 4 at substantially the same angle as the slanting angle of the teeth of the cavity 33 in FIG. 4. In an alternative embodiment, the sprue 39 can have a helical configuration similar to that of the helical cavity 33. Again, the slant of the sprue 39 and the cavity 33 should be the same or substantially the same. In another alternative embodiment, the gating system 38 should include a stripper plate to remove the gating material prior to the opening of the mold halves 31, 32.

In the apparatus 40 as illustrated in FIG. 4, an end plate 41 is attached to the mold half 32. The conduit or cavity 42 extends through the end plate 41 and accommodates an ejection tool 43. An end plate 44 of the ejection tool 43 abuts the end 45 of the cavity 34. After molding material has been inserted through the sprue 39 and into the cavities 33, 34, the moldable material engages the end plate 44 of the ejection tool 43. The end plate 44 preferably has a smooth surface for engaging the gear and still more preferably, the end plate 44 is loosely attached to the end of the ejection tool 43 so that the plate 44 can rotate as the gear 13 is extracted from the mold halves 31, 32.

Figure 4A:
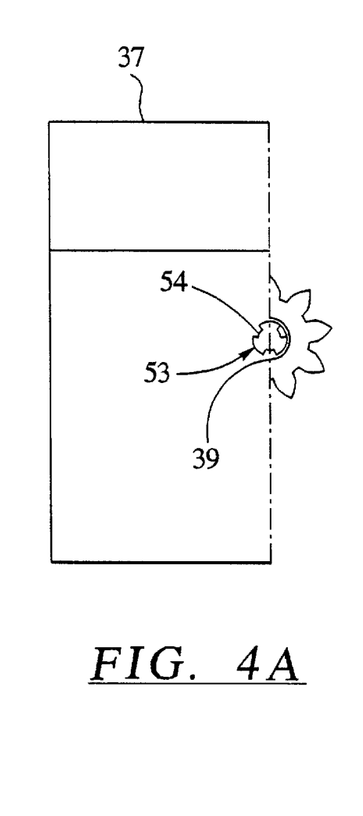
FIG. 4A is a partial sectional view taken along line 4A—4A of FIG. 4.

As shown in FIGS. 4–7, a shaft 51 may be inserted through the ejection tool 43 and through both cavities 33, 34. The end 52 of the shaft 51 is supported in the sprue 39 by a slotted shaft support 53 which is shown in FIG. 4A. The slots shown generally at 54 permit the moldable material to pass through the sprue 39 when the shaft 51 and support 53 are in place.

Figure 5:
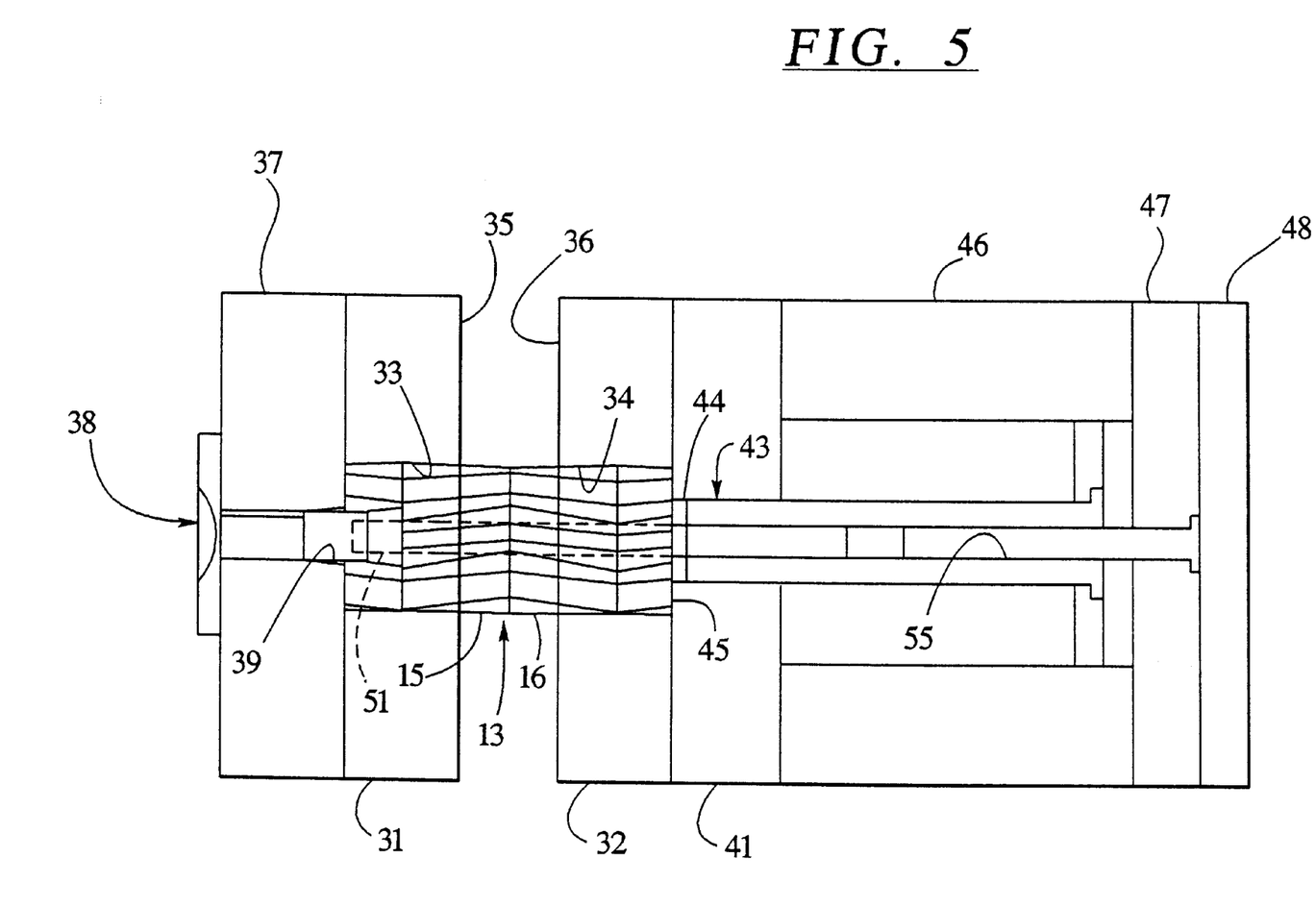
FIG. 5 is an illustration of the apparatus shown in FIG. 4 during extraction of the molded herringbone gear from the apparatus.
Figure 6:
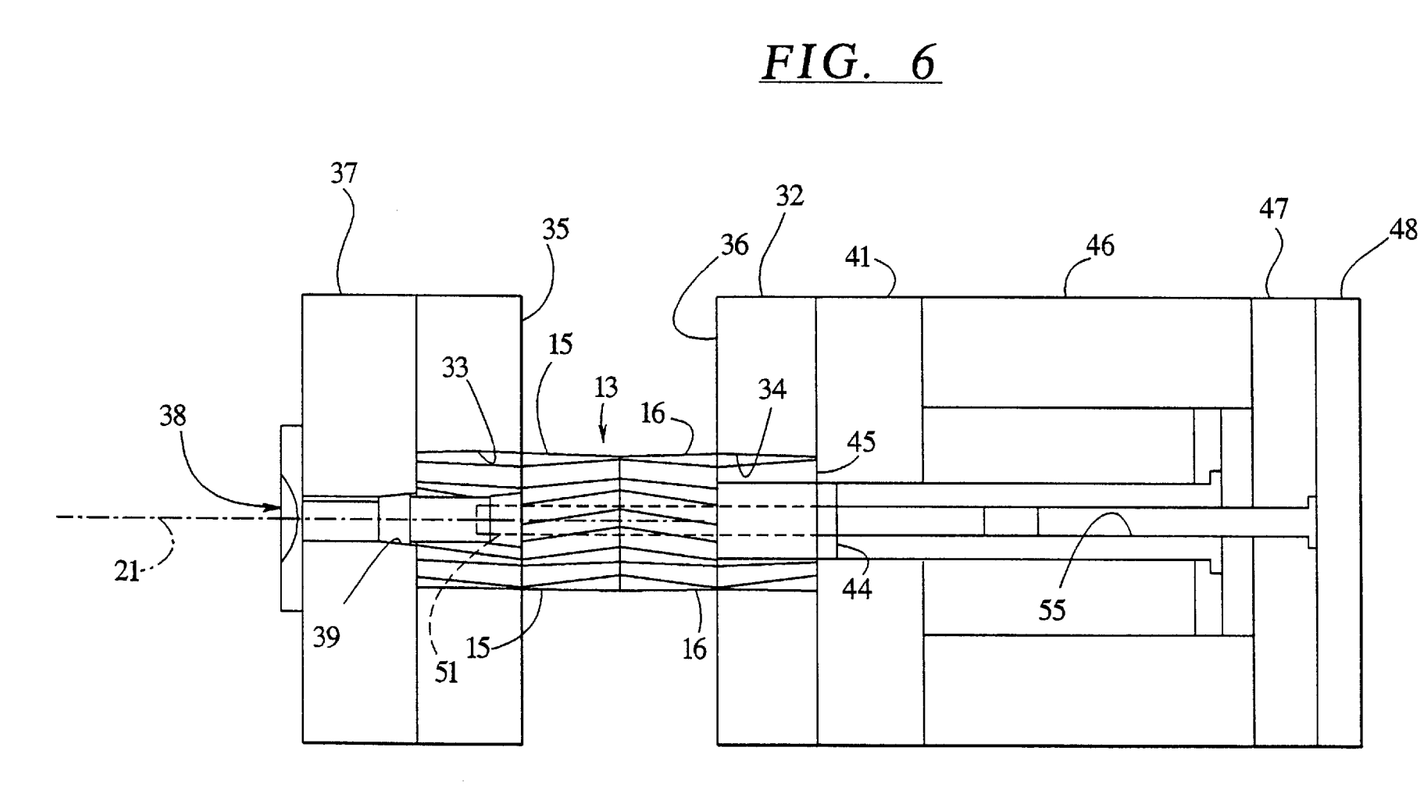
FIG. 6 is an illustration of the apparatus shown in FIG. 4 during extraction of the molded herringbone gear from the apparatus.
Figure 7:
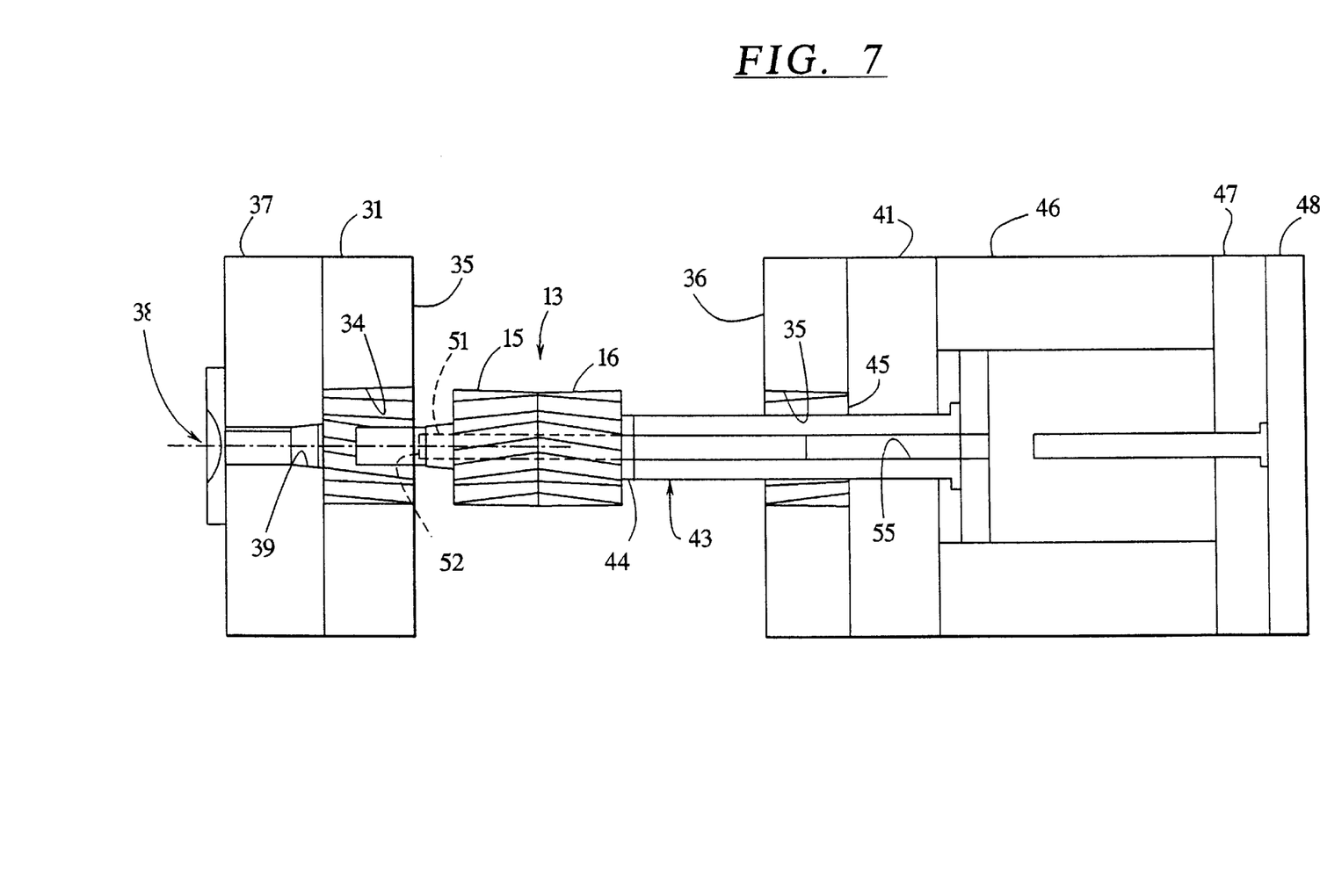
FIG. 7 is an illustration of the apparatus shown in FIG. 4 at the end of the extraction of the herringbone gear from the apparatus.

To extract the gear 13 and shaft 51 from the cavities 33, 34, the mold halves 31, 32 must be separated. In the embodiment illustrated in FIGS. 4–7, this is accomplished by pulling the mold half 32, end plate 41, structural bracket 46 and end plates 47, 48 to the right as illustrated in FIGS. 5, 6 and 7. The left mold half 31 remains fixed in place. As illustrated below with respect to FIG. 9, the ejection tool 43 moves to the right at a slower rate than the mold half 32 and, as a result, the cavity 34 passes over the end 44 of the ejection tool 43 as illustrated in FIGS. 5, 6 and 7.

As the gear 13 is extracted from both cavities 33, 34 simultaneously, the gear rotates. As noted above, the smooth end plate 44 rotates with the rotation of the gear 13. The shaft 51 slides through the central bore 55 of the tool 43 as the gear 13 and shaft are extracted.

Figure 8:
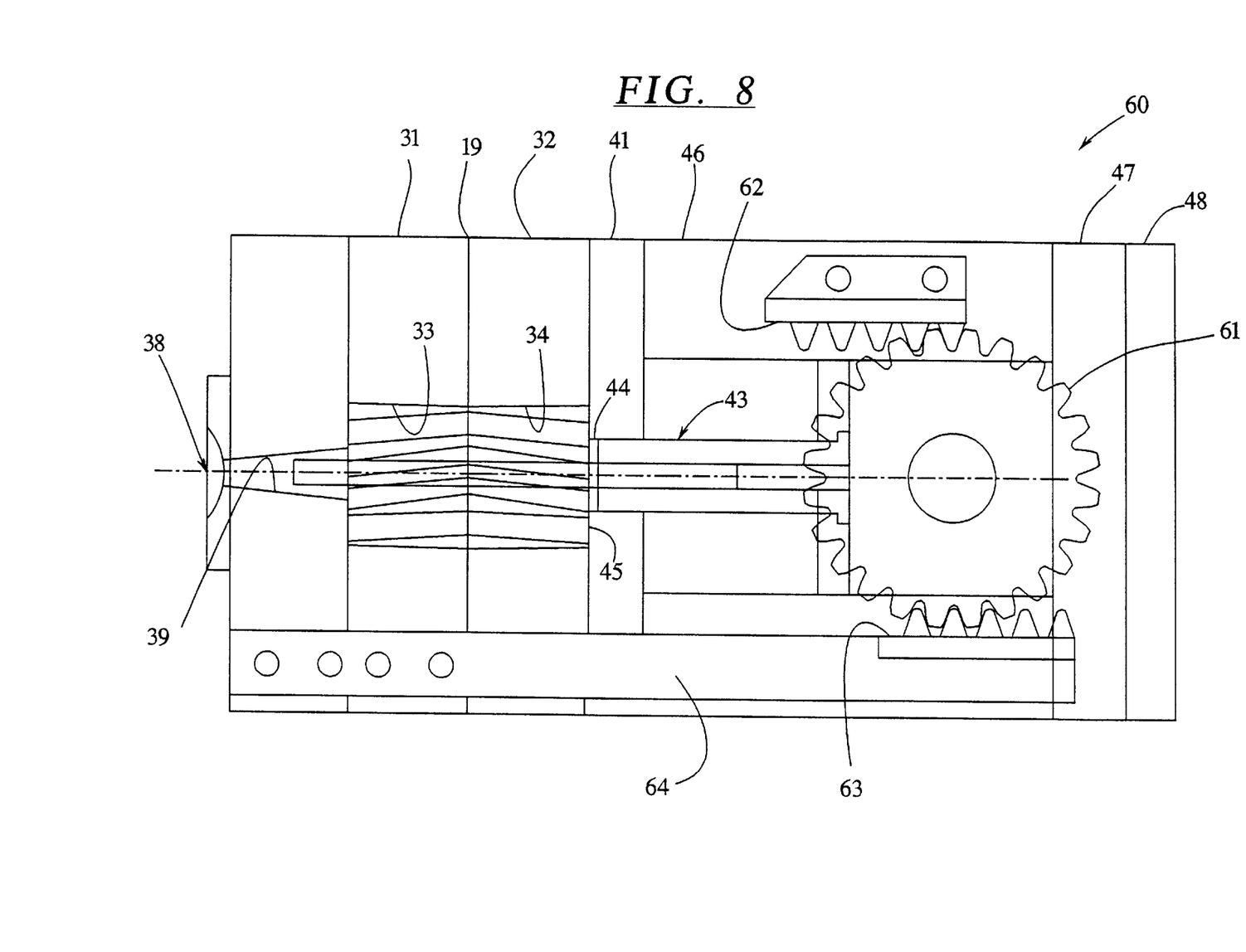
FIG. 8 is a sectional view of another embodiment of an apparatus for manufacturing herringbone gears in accordance with the present invention.

Another embodiment of the present invention is illustrated by apparatus 60 in FIGS. 8–11. Again, the right mold half 32 is moved to the right while the left mold half 31 remains fixed in place as illustrated in FIGS. 4–7. The two mold halves 31, 32 are separated upon rotation of the gear 61 which is meshed with the rack of teeth 62 and the rack of teeth 63. When the gear 61 is rotated in the clockwise direction as shown in FIG. 8, the rack of teeth 62 is pulled to the right which, by way of its attachment to the structural member 46, pulls the end plate 41 and right mold half 32 to the right.

Figure 9:
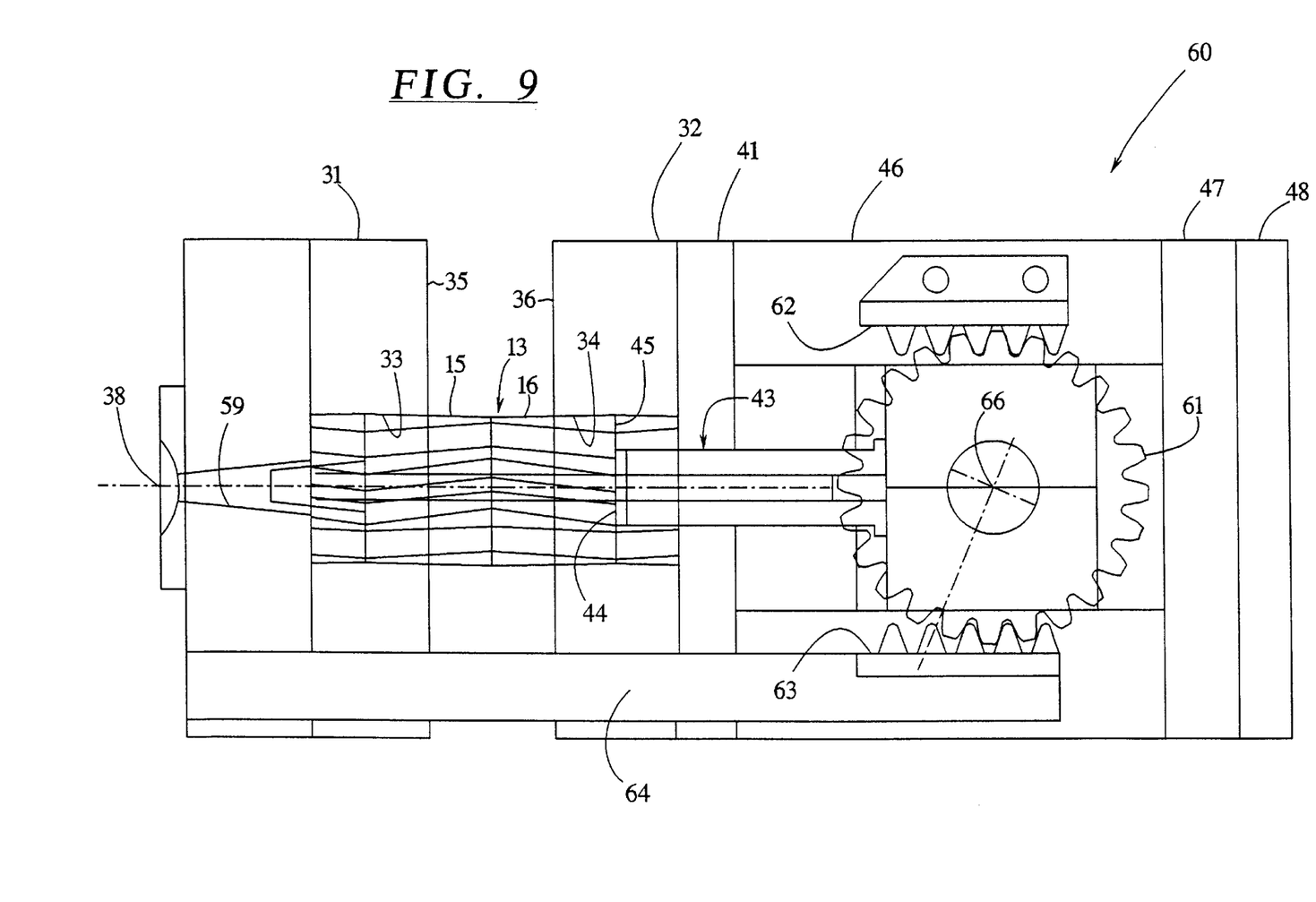
FIG. 9 is an illustration of the apparatus shown in FIG. 8 during extraction of the herringbone gear from the apparatus.
Figure 10:
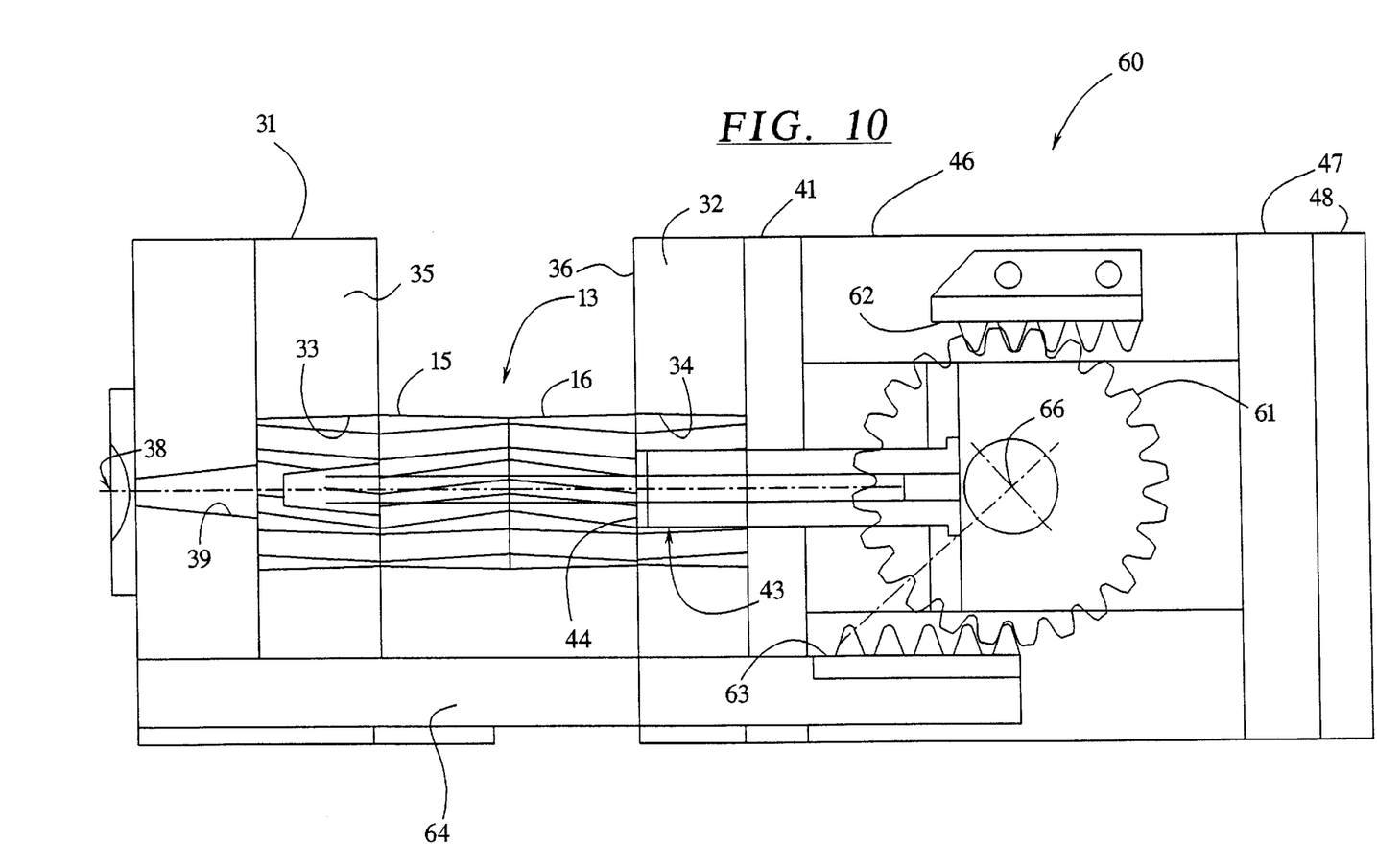
FIG. 10 is an illustration of the apparatus shown in FIG. 8 during extraction of the herringbone gear from the apparatus.

As illustrated in FIG. 9, rotation of the gear 61 causes the right side of the mold 60 (namely the right mold half 32, plate 41, structural support 46 and end structures 47, 48) to move to the right a distance or at a rate d. In contrast, because the gear 61 is meshed with the teeth 63 which are fixed in space by way of the connection to the left mold half 31 and the support 62, the center line 66 of the gear 61 moves only a distance or at a rate d/2 or one half the rate that the right side of the mold moves. Further, the ejector tool 43 is connected to the gear 61 and therefore moves to the right of the rate the gear 61 moves (i.e. d/2). As the right mold half 32 moves to the right at rate d, the ejector tool moves to the right at rate d/2 and the cavity 34 passes over the end plate 44 of the ejector tool 43. Further, the gear 13 is moving to the right at the rate d/2 which caused the gear to be ejected or rotated out of both the right mold half 31 and left mold half 32 simultaneously as illustrated in FIGS. 9–11 and simultaneously as the mold 60 is opened.

Figure 11:
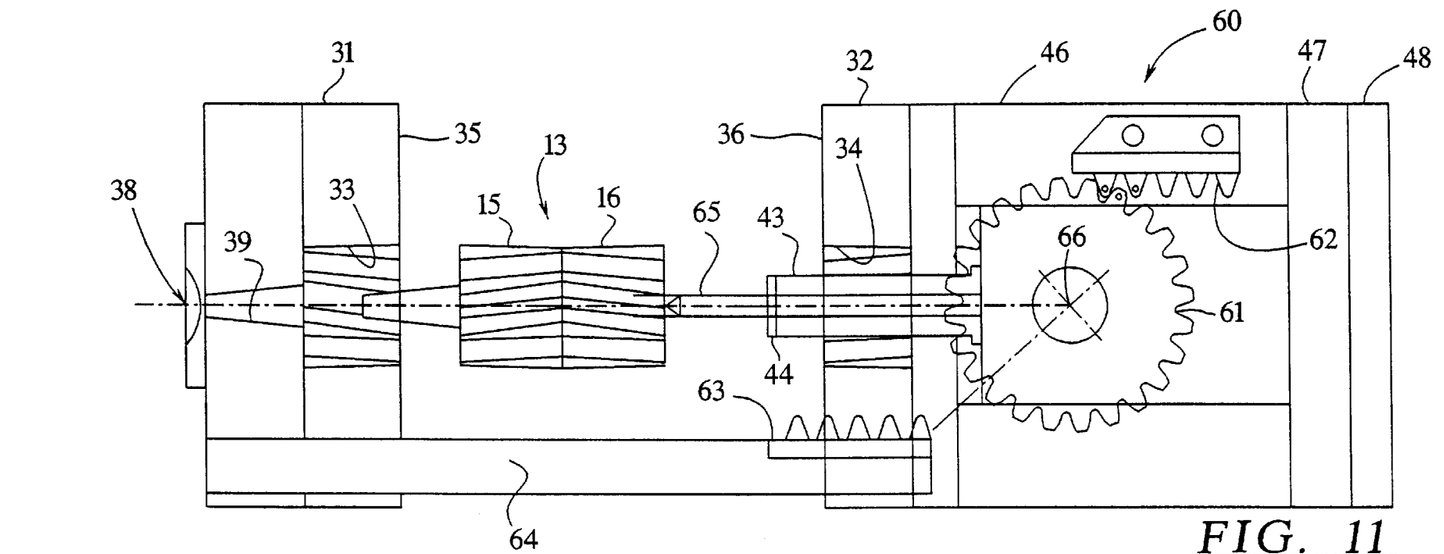
FIG. 11 is an illustration of the apparatus shown in FIG. 8 after the herringbone gear has been extracted from the apparatus.

As illustrated in FIG. 11, a central shaft 65 may extend outward from the center of the extraction tool 43 to facilitate the clearing of the apparatus 60 for the next cycle.

In operation, the mold halves 31, 32 are placed together as illustrated in FIGS. 4 and 8. The molding material is then injected through the gate system 38. The material is allowed to solidify before the mold halves 31, 32 are separated as illustrated in FIGS. 5–7 and 9–11. During the separation of the mold halves 31, 32, the gear 13 rotates as it is simultaneously extracted from the cavities 33, 34. This, the opening or separation of the mold halves 31, 32 causes the extraction of the gear 13. The molding material must be strong enough and the helical lead slight enough to permit the simultaneous opening of the mold halves 31, 32 and extraction of the gear 13.

The molding material used to fabricate the gear 13 may be a thermoplastic or a melt processable metal. Suitable thermoplastic materials include polyphenylene sulfide, polyetheretherketone, liquid crystal polymers, acetal resins and fluropolymers. Suitable metallic processes include investment casting and lost wax casting. The gears could also be fabricated from stainless steel. Other suitable materials will be apparent to those skilled in the art. The helical lead may vary from 10 inches per revolution to 30 inches per revolution depending upon the profile/contact ratio of the gear and the strength of the molding material.

Figure 12:
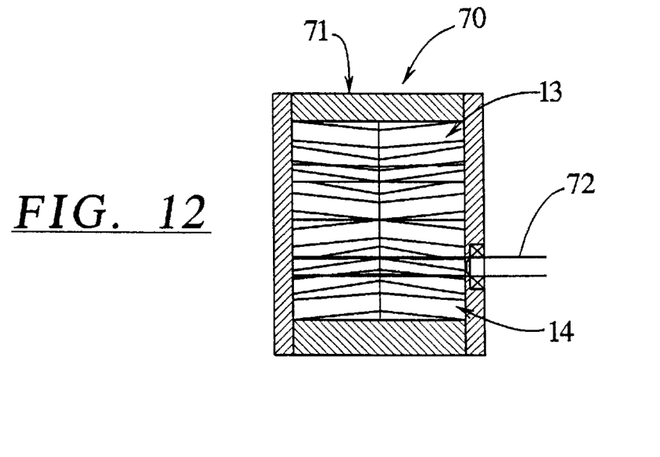
FIG. 12 is an illustration of a pump made in accordance with the present invention incorporating the injection molded herringbone gears of the present invention.

FIG. 12 illustrates a pump 70 that incorporates two molded herringbone gears 13, 14 made in accordance with the present invention. The pump 70 includes a housing 71 which defines a cavity which accommodates the two meshing gears 13, 14. The herringbone gear 14 is mounted onto a drive shaft 72 which imparts rotation to the gear 14. The meshing relationship between the gear 14 and the gear 13 results in rotation of the gear 13.

From the above description, it is apparent that the objects of the present invention have been achieved. While only certain embodiments have been set forth, alternative embodiments and various modifications will be apparent to those skilled in the art. These and other alternatives are considered equivalents within the spirit and scope of the present invention.

What is claimed is:

1. An apparatus for manufacturing a herringbone gear, the gear comprising two helical gear halves disposed along a common longitudinal axis and on opposing sides of a central plane extending perpendicular to the axis, each helical gear half having a helical lead, the helical leads of the helical gear halves being substantially the same in magnitude but opposite in direction, the apparatus comprising:

two mold halves corresponding to the two halves of the gear, each mold half comprising a mold cavity corresponding to one half of the gear and an inner mating face for sealing engagement with the inner mating face of the other mold half, the two mating faces of the mold halves corresponding to the central plane of the gear, one of said mold halves comprising a gate for injecting molding material into the mold halves, at least one of said mold halves being capable of longitudinal movement along the axis of the gear.

2. The apparatus of claim 1 wherein one of mold halves further comprises an elongated cavity disposed along the axis for accommodating a gear shaft.

3. The apparatus claim 1 wherein one of said mold halves is longer than the other mold half.

4. The apparatus of claim 1 wherein the gate further comprises a stripper plate.

5. The apparatus of claim 1 wherein the gate further comprises a helical gate having a gate helical lead substantially the same as the helical lead of the mold cavity adjacent to which the gate is disposed.

6. The apparatus of claim 1 wherein the gate further comprises a conical gate having an interior surface that slants toward the axis of the gear at substantially the same angle of the helical lead of the mold cavity adjacent to which the gate is disposed.

7. The apparatus of claim 1 wherein longitudinal movement of one mold half away from the other mold half results in a simultaneous extraction of the gear from both mold halves.

8. The apparatus of claim 1 wherein both of said mold halves are rigidly constrained in all directions except in a longitudinal direction along the axis.

9. The apparatus of claim 1 wherein the central plane is disposed along the apex of each tooth of said herringbone gear.

10. The apparatus of claim 1 wherein the central plane is disposed along the centerline of each tooth of said herringbone gear.

* * * * *